United States Patent
Kanno et al.

[11] Patent Number: 6,110,084
[45] Date of Patent: Aug. 29, 2000

[54] COMBINED ROLL HAVING EXCELLENT RESISTANCE TO THERMAL SHOCK

[75] Inventors: Toshitake Kanno; Jun Iwahashi, both of Shizuoka-ken; Naoshi Yamashita, Gifu-ken; Kouichi Mabuchi, Gifu-ken; Noriyuki Kakehashi, Gifu-ken; Noriaki Miwa, Gifu-ken, all of Japan

[73] Assignees: Mitsubishi Materials Corporation, Tokyo; Kimura Chuzosho Co., Ltd., Sunto-gun, both of Japan

[21] Appl. No.: 09/104,336

[22] Filed: Jun. 25, 1998

[30] Foreign Application Priority Data

Jun. 27, 1997 [JP] Japan ................................ 9-171550

[51] Int. Cl.$^7$ ........................................ B23P 15/00
[52] U.S. Cl. ........................................ 492/1; 492/3; 492/54
[58] Field of Search ................................ 492/1, 3, 38, 54

[56] References Cited

U.S. PATENT DOCUMENTS

| | | |
|---|---|---|
| 5,044,056 | 9/1991 | Sundstedt et al. . |
| 5,104,458 | 4/1992 | Sundstedt et al. . |
| 5,167,067 | 12/1992 | Sundstedt et al. . |
| 5,248,289 | 9/1993 | Carlsson et al. . |
| 5,359,772 | 11/1994 | Carlsson et al. . |

FOREIGN PATENT DOCUMENTS

| | | |
|---|---|---|
| 0 753 594 A1 | 1/1997 | European Pat. Off. . |
| 57-171561 | 10/1982 | Japan . |
| 60-24208 | 2/1985 | Japan . |
| 60-24209 | 2/1985 | Japan . |
| 60-46861 | 3/1985 | Japan . |
| 60-111704 | 6/1985 | Japan . |
| 61-219408 | 9/1986 | Japan . |
| 1-107912 | 4/1989 | Japan . |
| 1-273661 | 11/1989 | Japan . |
| 2-65403 U | 5/1990 | Japan . |
| 2-175014 | 7/1990 | Japan . |
| B2-6-99776 | 9/1990 | Japan . |
| 4-319059 | 11/1992 | Japan . |
| 6-269926 | 9/1994 | Japan . |
| 8-158004 | 6/1996 | Japan . |
| 9-31591 | 2/1997 | Japan . |

*Primary Examiner*—Irene Cuda
*Attorney, Agent, or Firm*—Oblon, Spivak, McClelland, Maier & Neustadt, P.C.

[57] ABSTRACT

A combined roll is provided which offers excellent resistance to thermal shock. In this combined roll, an external ring portion is formed of a cemented carbide, and an internal ring portion is formed of a ductile iron metallurgically bonded to the external ring portion by means of casting. The external ring portion is formed of a cemented carbide containing, as binder phase-defining components, Co: 5–27%, Ni: 2–12% and Cr: 0.3–3% and WC as substantially all of the balance and as a hard phase-defining component. The internal ring portion is formed of a ductile iron composed of C: 3 4.5%, Si: 1.5–4.5%, Mn: 0.1–2% and Mg: 0.02–0.2% and, as the balance, Fe and incidental impurities. The internal ring portion may also contain 0.1–5% of one or more of Mo, Cu, Cr, V, W, Sn and Sb. The internal ring portion contains a cored spheroidal graphite structure dispersed in a mixed phase of either perlite, beinite and martensite phases with a ferrite phase. The cored spheroidal graphite structure has a spheroidal graphite core formed during casting and a periphery deposited around the core during thermal treatment.

15 Claims, 1 Drawing Sheet

COMBINED ROLL HAVING EXCELLENT RESISTANCE TO THERMAL SHOCK

BACKGROUND OF THE INVENTION

1. Field of the Invention

This invention is directed to a combined roll which is highly resistant to thermal shock.

2. Description of the Related Art

Combined rolls are useful as structural members in rolling apparatus and are generally made of iron and steel or a non-ferrous alloy such as copper alloy, aluminum alloy or the like.

An example of the above-mentioned combined roll is disclosed in Japanese Examined Patent Publication No. 6-99776. This combined roll has an external ring portion made from a tungsten carbide-based cemented carbide (hereinafter referred to simply as "a cemented carbide") and an internal ring portion made from ductile iron and casted to the external ring portion. Because of the casting, a metallurgical bond is formed between the external and internal rings.

Recently, high performance and high power have become important in the field of combined rolls. The result is an increase in both rolling speed and reduction ratio. Because the surface of a pressure roll is not always in contact with the material to be rolled, any increase in the rolling speed and reduction ratio subject the pressure roll to severe and repeated thermal shock. Under such strict operating conditions, conventional combined rolls, such as those mentioned above, may break due to their insufficient resistance to thermal shock.

SUMMARY OF THE INVENTION

With the foregoing problems in view, one object of the present invention is to provide a combined roll having excellent resistance to thermal shock.

The first embodiment of the present invention relates to a combined roll, that includes:

an external ring portion, and an internal ring portion bonded to said external ring portion, wherein said external ring portion is formed from a cemented tungsten carbide containing, by weight percentage,
Co: 5–27%, Ni: 2–12% and Cr: 0.3–3%, and
tungsten carbide as substantially all of the balance, and
wherein said internal ring portion is formed from a ductile iron containing, by weight percentage,
C: 3–4.5%, Si: 1.5–4.5%, Mn: 0.1–2% and Mg: 0.02–0.2%, and
Fe and incidental impurities as the balance, and wherein said internal ring portion contains a cored spheroidal graphite structure dispersed in a mixed phase including a ferrite phase and a phase selected from the group consisting of a perlite phase, a beinite phase and a martensite phase, said cored spheroidal graphite structure including a spheroidal graphite core and graphite peripherally deposited around said core.

The second embodiment of the present invention relates to a combined roll, that includes:

an external ring portion, and an internal ring portion bonded to said external ring portion, wherein said external ring portion is formed from a cemented tungsten carbide containing, by weight percentage,
Co: 5–27%, Ni: 2–12% and Cr: 0.3–3%, and
tungsten carbide as substantially all of the balance, and
wherein said internal ring portion is formed from a ductile iron containing, by weight percentage,
C: 3–4.5%, Si: 1.5–4.5%, Mn: 0.1–2% and Mg: 0.02–0.2%, and
0.1–5% of at least one stabilizing component selected from the group consisting of Mo, Cu, Cr, V, W, Sn, and Sb, and mixtures thereof, and
Fe and incidental impurities as the balance, and wherein said internal ring portion contains a cored spheroidal graphite structure dispersed in a mixed phase including a ferrite phase and a phase selected from the group consisting of a perlite phase, a beinite phase and a martensite phase, said cored spheroidal graphite structure including a spheroidal graphite core and graphite peripherally deposited around said core.

The third embodiment of the present invention relates to a method for producing a combined roll, that includes:

forming an external ring portion from a cemented tungsten carbide containing, by weight percentage,
Co: 5–27%, Ni: 2–12% and Cr: 0.3–3%, and
tungsten carbide as substantially all of the balance;

casting, into said external ring portion, an internal ring portion from a ductile iron containing, by weight percentage,
C: 3–4.5%, Si: 1.5–4.5%, Mn: 0.1–2% and Mg: 0.02–0.2%, and
Fe and incidental impurities as the balance; and thermally treating.

DESCRIPTION OF THE PREFERRED EMBODIMENTS

Figure 1:
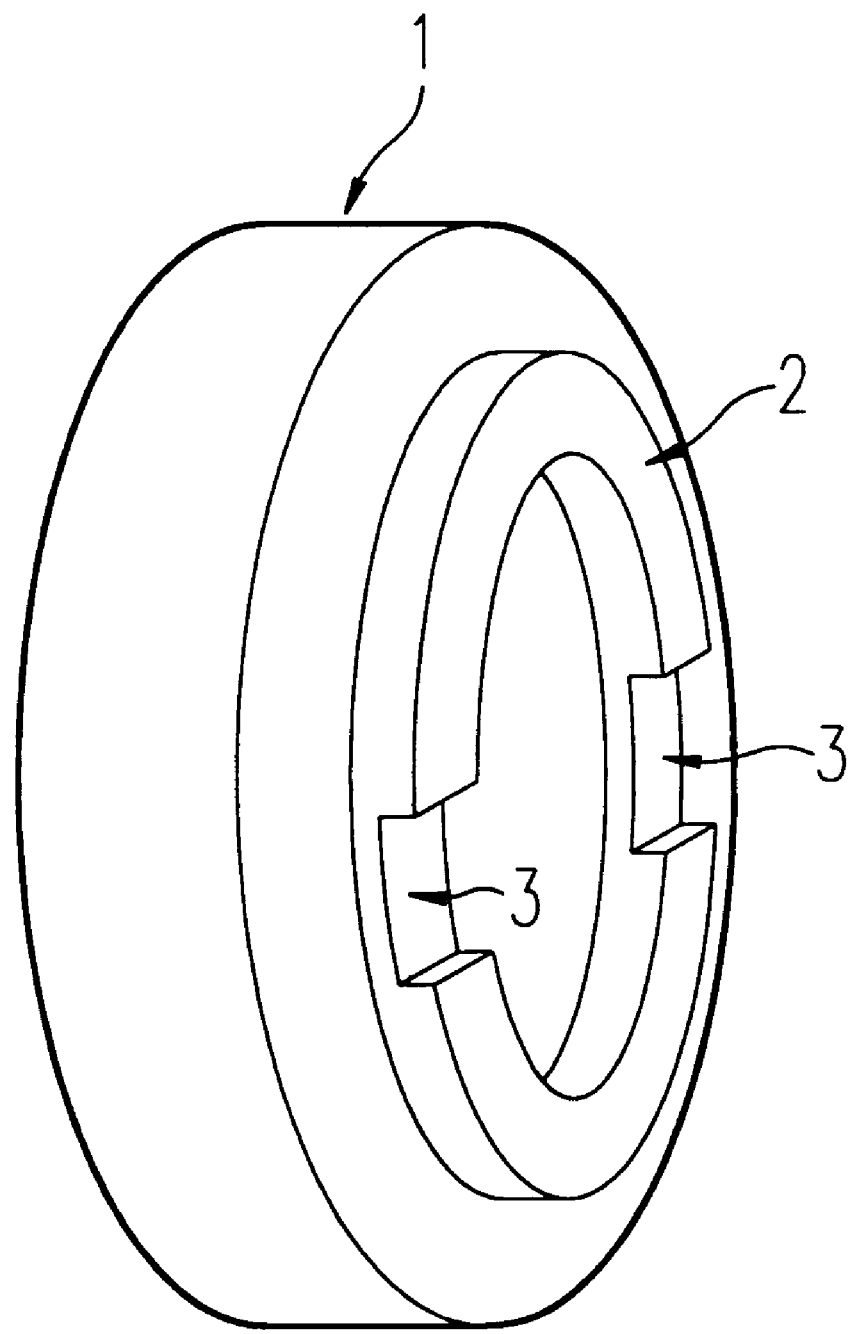
FIG. 1 illustrates an embodiment of the combined rolls. The external roll portion (1). The internal roll portion (2) which is provided with a protrusion. The diametrical key ways (3).

Other features of the invention will become apparent in the course of the following descriptions of preferred embodiments, which are not intended to be limiting unless otherwise specified.

Preferably, the combined roll is constructed with an external ring portion and an internal ring portion integrally metallurgically bonded thereto by means of casting, the external ring portion being formed of a cemented carbide containing, as binder phase-defining components, in terms of weight percentage (all percentages used herein being by weight unless otherwise noted), Co: 5–27%, Ni: 2–12% and Cr: 0.3–3% and tungsten carbide (hereafter called "WC") as substantially all of the balance and as a hard phase-defining component, the internal ring portion being formed of a ductile iron wherein a spheroidal graphite is distributed in dispersed condition in a perlite phase-based substrate by casting a molten metal in the external ring portion, which molten metal is composed of C: 3–4.5%, Si: 1.5–4.5%, Mn: 0.1–2% and
Mg: 0.02–0.2% and further of, where desired, 0.1–5% of one or more of

Mo, Cu, Cr, V, W, Sn and Sb
and, as the balance, Fe and incidental impurities.

The combined roll thus obtained is then preferably thermally treated by repeated heating and cooling in a temperature range between more than 450° C., more preferably 500° C., and most preferably 550° C. and less than the solid phase line of the ductile iron so that a ferrite phase is formed in the ductile iron substrate in the internal ring portion. These ranges include all values and subranges therebetween. As a result, the ductile iron substrate is a mixed phase primarily composed of both a perlite phase and a ferrite phase. In addition, graphite is deposited around the periphery of the spheroidal graphite that was generated during casting. The resulting cored spheroidal graphite structure has a spheroidal graphite core generated during the casting, and a periphery disposed around the core and formed from the graphite that was generated from the thermal treatment. When a combined roll is made from an internal ring portion of ductile iron having a cored spheroidal graphite structure resulting from precipitating graphite around a spheroidal graphite core generated during the casting, which cored spheroidal graphite structure is dispersed in the perlite phase- and ferrite phase-based substrate, the combined roll exhibits outstanding resistance to thermal shock when used together with an external ring portion formed from a cemented carbide of the above stated composition. Even in the case of high speed rolling or rolling with a large reduction ratio, the combined roll exhibits excellent performance over a prolonged period of time and without breakage. In addition, the combined roll can be austempered or tempered so as to further improve its strength. In this instance, in the internal ring portion, the perlite phase in the ductile iron substrate is transformed into a beinite or martensite phase so that the cast iron substrate has a beinite phase- and ferrite phase-based structure or a martensite phase- and a ferrite phase-based structure.

The invention provides a combined roll having excellent resistance to thermal shock. Preferably, the combined roll includes an external ring portion and an internal ring portion integrally metallurgically bonded to the internal ring portion by means of casting, the external ring portion being formed of a tungsten carbide-based cemented carbide containing, as binder phase-defining components, by weight percentage, Co: 5–27%, Ni: 2–12% and Cr: 0.3–3% and tungsten carbide as substantially all of the balance and as a hard phase-defining component, the internal ring portion being formed of a ductile iron composed of, by weight percentage, C: 3–4.5%, Si: 1.5–4.5%, Mn: 0.1–2% and Mg: 0.02–0.2% and, as the balance, Fe and incidental impurities and having a cored spheroidal graphite distributed in dispersed condition in a substrate constituted dominantly of a mixed phase of one selected from the group consisting of a perlite phase, a beinite phase and a martensite phase with a ferrite phase, the cored spheroidal graphite having a core formed during casting and a periphery deposited around the core during thermal treatment.

More preferably, the invention provides a combined roll of excellent resistance to thermal shock which comprises an external ring portion and an internal ring portion integrally metallurgical bonded thereto by means of casting, the external ring portion being formed of a tungsten carbide-based cemented carbide containing, as binder phase-defining components, by weight percentage, Co: 5–27%, Ni: 2–12% and Cr: 0.3–3% and tungsten carbide as substantially all of the balance and as a hard phase-defining component, the internal ring portion being formed of a ductile iron composed of, by weight percentage, C: 3–4.5%, Si: 1.5–4.5%, Mn: 0.1–2% and Mg: 0.02–0.2% and further of, where desired, 0.1–5% of at least one selected from the group consisting of Mo, Cu, Cr, V, W, Sn and Sb and, as the balance, Fe and incidental impurities and having a cored spheroidal graphite distributed in dispersed condition in a substrate composed dominantly of a mixed phase of one selected from the group consisting of a perlite phase, a beinite phase and a martensite phase with a ferrite phase, the cored spheroidal graphite having a core formed during casting and a periphery deposited around the core during thermal treatment.

Preferably, in order to produce the combined roll according to the present invention, it is desired that (a) prior to casting of a molten metal of the ductile iron, the external ring portion be preheated on its inner surface at a temperature of 600° C. or above, preferably 700° C. or above, and more preferably 900° C. or above, (b) with the molten metal disposed, the associated casting mold be wholly preheated along with the external ring portion, or (c) the molten metal of the ductile iron be cast at a temperature of not less than 1450° C., preferably not less than 1500° C., and more preferably not less than 1550° C. These ranges include all values and subranges therebetween. In such a manner, the molten metal after being cast is maintained as melted for preferably 10 seconds or longer, more preferably 15 seconds or longer, and most preferably 20 seconds or longer at an interfacial boundary defined together with the inner surface of the external ring portion. These ranges include all values and subranges therebetween. This permits the molten metal to diffuse with respect to the external ring portion with the result that free graphite can deposit in a width or an interfacial boundary of preferably more than 0.2 mm, more preferably more than 0.5 mm, and most preferably more than 0.7 mm at a contact interface between the internal and external ring portions, thus contributing greatly to enhanced bondability between both ring portions. These ranges include all values and subranges therebetween.

The combined roll is described below with particular regard to the preferred composition of the cemented tungsten carbide for the external ring portion and the preferred composition of the ductile iron for the internal ring portion. All percentages are weight percent unless otherwise noted.

(A) Cemented tungsten carbide (a) Co

Co is believed to provide improved sintering and also to form a binder phase, thereby improving toughness. Less than 5% of this component in content fails to give those effects as desired, whereas more than 27% causes a sharp decline in wear resistance. Hence, the content of Co should be in the range of 5–27%, preferably 10–20%, and more preferably 15–19%. These ranges include all values and subranges therebetween.

(b) Ni

Ni is believed to improve sintering, like Co, and dissolves in Co to form a binder phase, thus leading to improved toughness. Additionally, Ni is believed to cooperate with Cr to improve oxidation resistance and corrosion resistance. Less than 2% of Ni is ineffective in providing oxidation resistance and corrosion resistance to an acceptable extent, and more than 12% results in low impact resistance.

Therefore, the content of Ni should be in the range of 2–12%, preferably 5–10%, and more preferably 7–9%. These ranges include all values and subranges therebetween.

(c) Cr

Cr dissolves along with Ni in Co to form a binder phase, and as mentioned above, Cr is believed to improve oxidation resistance and corrosion resistance in the presence of Ni. Less than 0.3% of Cr is not effective to obtain these advantages, and more than 3% results in the deposit of Cr carbide, resulting in reduced toughness. Therefore, the content of Cr should be in the range of 0.3–3%, preferably 0.9–2.4%, and more preferably 1–2.0%. These ranges include all values and subranges therebetween.

(B) Ductile iron (a) C

C forms a cored spheroidal graphite structure, thereby achieving improved resistance to thermal shock. Also, advantageously, C forms a phase of perlite, beinite or martensite in the corresponding substrate. Less than 3% of this component does not allow the beneficial effects to be obtained, while more than 4.5% results in too large a ratio of spheroidal graphite to substrate with an accompanying sharp drop in strength. Therefore, the content of C should be in the range of 3–4.5%, preferably of 3.2–4%, and more preferably 3.3–3.9%. These ranges include all values and subranges therebetween.

(b) Si

Si facilitates the formation of spheroidal graphite and moreover improves the castability of the molten metal. Less than 1.5% of this component fails to satisfactorily produce these benefits. On the other hand, more than 4.5% allows the ferrite phase in the substrate to change to a brittle silicon ferrite phase, thus giving rise to reduced strength and diminished impact resistance. Thus, content of Si should be in the range of 1.5–4.5%, preferably of 1.7–3%, and more preferably 1.9–2.8%. These ranges include all values and subranges therebetween.

(c) Mn

Mn serves to stably form a perlite phase in the substrate during casting. An unstable formation of the perlite phase leads to an unstable ferrite phase at the time of thermal treatment in a subsequent process step, thus making it difficult to obtain the desired structure in stabilized manner. Less than 0.1% of this component is not effective for obtaining such beneficial effects, and more than 2% is responsible for impaired toughness. Therefore, the content of Mn should be in the range of 0.1–2%, preferably 0.2–1%, and more preferably 0.3–0.9%. These ranges include all values and subranges therebetween.

(d) Mg

Mg is believed to act to form the resulting graphite into a spheroidal shape, thus exerting improved strength. Less than 0.02% of this component is ineffective in obtaining this desired advantage. Conversely, more than 0.2% inhibits graphite from becoming crystalline, eventually inviting chilling and hence brittleness. To preclude such physical deterioration, the content of Mg should be in the range of 0.02–0.2%, preferably 0.03–0.1%, and more preferably 0.05–0.09%. These ranges include all values and subranges therebetween.

(e) Mo, Cu, V, W, Sn and Sb

These components act to improve the stability of the perlite phase during casting (such components are generically termed "structure-stabilizing components"). The structure-stabilizing component may be optionally added when it is found desirable. Less than 0.1% of this stabilizing component, if added, fails to produce satisfactory results, whereas more than 5% results in reduced toughness. Thus, the content of this structure-stabilizing component should preferably be in the range of 0.1–5%, more preferably of 0.3–2%, and most preferably 0.4–1.8%. These ranges include all values and subranges therebetween.

EXAMPLES

Having generally described this invention, a further understanding can be obtained by reference to certain specific examples, which are provided herein for purposes of illustration only and are not intended to be limiting unless otherwise specified.

As starting particulate materials, a WC powder, a $Cr_3C_2$ powder, a Co powder and a Ni powder were prepared, each of which had an average particle diameter of 1–5 $\mu$m. After being formulated so as to have a composition shown in Table 1, the starting particulate materials were wet-blended in a ball mill for 72 hours and then dried, followed by press molding of the blend at a pressure of 1 ton/cm$^2$ to thereby obtain a ring-shaped press-molded structure. Sintering was thereafter effected with the resultant molded structure held in vacuo for 1 hour at a given temperature within the range of 1300–1500° C., whereby an external ring portion was produced which was composed of a cemented carbide of substantially the same composition as shown in Table 1 and was 50 mm in outside diameter, 34 mm in inside diameter and 10 mm in width. In this way, external ring portions A–E were produced.

Molten metals of ductile irons for the internal ring portions a–p were prepared with a conventional high-frequency induction furnace. The molten metals had the compositions as shown in Table 2. After the external ring portion was preheated at 750° C., each of the molten metals was cast into the above external ring portion used as a casting mold and thereafter cooled so that internal ring portions a–p were integrally metallurgically bonded to the external ring portions A–E. The combinations of internal and external ring portions are shown in Table 3. Subsequently, each such internal roll portion was machined and finished in the shape shown in FIG. 1. To be more specific, on its one side, the internal roll portion having an inner diameter of 18 mm was arranged to be coextensive (coplanar) with one side of the mating external roll portion having the above size. On the other side, the internal roll portion was provided with a protrusion extending 1.5 mm beyond the other side of the external roll portion and having an outer diameter of 34 mm. The internal roll portion further had on the other side two diametrical keyways opposed to each other and dimensioned to be 6 mm wide and 1.3 mm deep. Thus, combined rolls 1–16 were produced for use as comparative examples.

In each of comparative combined rolls 1–16, the ductile iron in the internal ring portion was of a structure having a spheroidal graphite dispersed in a substrate composed mainly of a perlite phase.

Next, comparative combined rolls 1–16 were subjected to 3-cycle heat treatment, 1 cycle being preset such that heating was effected up to 950° C. at a heating speed of 100° C./hr, and after standing at this temperature for 2 hours, cooling was done up to 650° C. at a cooling speed of 100° C./hr. As a consequence, combined rolls 1–16 according to the present invention were produced as shown in Table 3.

In each of combined rolls 1–16 of the invention, the ductile iron in the internal ring portion was of a structure in which a cored spheroidal graphite made up of a core and a periphery placed therearound, was dispersed in a substrate composed mainly of perlite and ferrite phases.

Additionally, combined rolls 1–16 of the invention were exposed to either one of heat treatments (a) and (b) indicated below with the result that the ductile iron substrates used in the internal ring portions converted to a beinite phase- and ferrite phase-based structure or a martensite phase- and ferrite phase-based structure as shown in Table 3.

(a) After being maintained at 900° C. for 1 hour, the combined roll was immersed in a salt bath at 320° C. and quenched and then held for 1 hour, after which it was taken out of the bath and subjected to air-cooled austempering.

(b) After being maintained at 900° C. for 1 hour, the combined roll was immersed in an oil bath at 200° C. and quenched and then held for 1 minute, after which it was taken out of the bath and subjected to air-cooled marquenching.

Accelerated thermal shock testing was performed on combined rolls 1–16. The accelerated thermal shock test was a cycle test set in such a manner that immediately after heating at 800° C. with a burner, immersion in water followed by quenching was effected. The number of cycles required for cracking to occur on the external ring portion that could be observed by visual inspection were measured. The results obtained are shown in Table 3.

TABLE 1

| Ring No. | | Co | Ni | Cr | WC |
|---|---|---|---|---|---|
| External ring portion | A | 5 | 2 | 0.3 | Balance |
| | B | 10 | 4.5 | 1 | Balance |
| | C | 15 | 7 | 1.7 | Balance |
| | D | 20 | 9.5 | 2.4 | Balance |
| | E | 27 | 12 | 3 | Balance |

Composition (wt %)

TABLE 2

| Ring. No. | C | Si | Mn | Mg | Structure-stabilizing component | Fe + impurity |
|---|---|---|---|---|---|---|
| Internal ring portion | | | | | | |
| a | 3.13 | 1.53 | 0.56 | 0.181 | — | Balance |
| b | 3.86 | 2.84 | 0.58 | 0.054 | — | Balance |
| c | 4.42 | 4.41 | 0.51 | 0.023 | — | Balance |
| d | 3.59 | 2.13 | 0.13 | 0.051 | — | Balance |
| e | 3.64 | 1.99 | 1.73 | 0.046 | — | Balance |
| f | 3.62 | 2.05 | 1.96 | 0.048 | — | Balance |
| g | 3.76 | 1.61 | 0.15 | 0.021 | Mo: 2.34 | Balance |
| h | 3.68 | 1.85 | 0.32 | 0.096 | Cu: 4.25 | Balance |
| i | 3.55 | 2.26 | 1.51 | 0.075 | Cr: 0.62 | Balance |
| j | 3.39 | 2.73 | 1.32 | 0.036 | V: 0.18 | Balance |
| k | 3.22 | 3.25 | 0.96 | 0.056 | W: 2.33 | Balance |
| l | 3.06 | 3.73 | 0.78 | 0.121 | Sn: 3.58 | Balance |
| m | 3.03 | 4.11 | 0.24 | 0.153 | Sb: 1.46 | Balance |
| n | 3.01 | 4.49 | 0.45 | 0.193 | Sn: 0.12 Cr: 0.10 | Balance |
| o | 4.09 | 1.53 | 1.06 | 0.042 | Cu: 1.24 Y: 0.82 Sb: 0.62 | Balance |
| p | 4.30 | 1.51 | 0.85 | 0.061 | Mo: 0.21 Cr: 2.05 V: 2.15 W: 0.27 | Balance |

Composition of ductile iron (wt %)

TABLE 3

| Roll No. | External ring portion | Internal ring portion | Number of cycles required for breakage to occur | Roll No. | Comparative combined roll chosen for heat treatment | Composition of internal ring portion* | Number of cycle required for breakage to occur |
|---|---|---|---|---|---|---|---|
| Comparative combined roll | | | | Combined roll of the present invention | | | |
| 1 | A | a | 3 | 1 | 1 | B + F | 13 |
| 2 | C | b | 5 | 2 | 2 | P + F | 19 |
| 3 | E | c | 7 | 3 | 3 | M + F | 25 |
| 4 | D | d | 8 | 4 | 4 | B + F | 27 |
| 5 | B | e | 4 | 5 | 5 | P + F | 15 |
| 6 | C | f | 5 | 6 | 6 | B + F | 16 |
| 7 | B | g | 4 | 7 | 7 | B + F | 14 |
| 8 | D | h | 7 | 8 | 8 | M + F | 30 |
| 9 | C | i | 6 | 9 | 9 | B + F | 20 |
| 10 | D | j | 8 | 10 | 10 | P + F | 26 |
| 11 | C | k | 6 | 11 | 11 | M + F | 18 |
| 12 | E | l | 9 | 12 | 12 | P + F | 32 |
| 13 | D | m | 8 | 13 | 13 | B + F | 28 |
| 14 | D | n | 6 | 14 | 14 | P + F | 24 |
| 15 | B | o | 3 | 15 | 15 | M + F | 13 |
| 16 | A | p | 1 | 16 | 16 | B + F | 12 |

*P: Perlite phase
B: Beinite phase
F: Ferrite phase
M: Martensite phase

As is clear from the results of Table 3, all of combined rolls 1–16 of the present invention show noticeably excellent resistance to thermal shock in the accelerated thermal impact testing as compared to comparative combined rolls 1–16. These advantages are believed to result in-part from the structure of a ductile iron used for formation of the internal ring portion, i.e., the structure specified to have a cored spheroidal graphite dispersed in a substrate composed mainly of a mixed phase of one of perlite, beinite and martensite phases with a ferrite phase. This is contrasted to the comparative structure in which a typical spheroidal graphite is dispersed in a perlite phase-based substrate.

As described above, the combined-roll of the present invention excels in not only thermal shock resistance but wear resistance and can therefore particularly suitable for high rolling speeds and reduction ratios required by high performance and high power rolling apparatus.

This application is based on Japanese Patent Application No. 9-171550, filed Jun 27, 1997, the entire contents of which are hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A combined roll, comprising:
   an external ring portion, and
   an internal ring portion bonded to said external ring portion, wherein
   said external ring portion is formed from a cemented tungsten carbide comprising, by weight percentage,
      Co: 5–27%, Ni: 2–12% and Cr: 0.3–3%, and
      tungsten carbide as substantially all of the balance, and wherein
   said internal ring portion is formed from a ductile iron comprising, by weight percentage,
      C: 3–4.5%, Si: 1.5–4.5%, Mn: 0.1–2% and Mg: 0.02–0.2%, and
      Fe and incidental impurities as the balance, and
   wherein said internal ring portion comprises a cored spheroidal graphite structure dispersed in a mixed phase comprising a ferrite phase and a phase selected from the group consisting of a perlite phase, a beinite phase and a martensite phase, said cored spheroidal graphite structure comprising a spheroidal graphite core and graphite peripherally deposited around said core.

2. The combined roll as claimed in claim 1, wherein said internal ring portion is integrally metallurgically bonded to said external ring portion by means of casting said internal ring portion into said external ring portion.

3. The combined roll as claimed in claim 2, wherein said core is formed during said casting.

4. The combined roll as claimed in claim 1, wherein said graphite peripherally deposited around said core is deposited by thermally treating said combined roll.

5. The combined roll as claimed in claim 1, wherein said mixed phase comprises a ferrite phase and a perlite phase.

6. The combined roll as claimed in claim 1, wherein said cemented tungsten carbide comprises said Co, Ni, and Cr as binder-phase defining components and said tungsten carbide as a hard-phase defining component.

7. The combined roll as claimed in claim 1, wherein said internal ring portion further comprises at least one stabilizing component selected from the group consisting of Mo, Cu, Cr, V, W, Sn, and Sb, and mixtures thereof.

8. The combined roll as claimed in claim 7, wherein said stabilizing component is present in an amount of 0.1–5% by weight.

9. A combined roll, comprising:
   an external ring portion, and
   an internal ring portion bonded to said external ring portion, wherein
   said external ring portion is formed from a cemented tungsten carbide comprising, by weight percentage,
      Co: 5–27%, Ni: 2–12% and Cr: 0.3–3%, and
      tungsten carbide as substantially all of the balance, and wherein
   said internal ring portion is formed from a ductile iron comprising, by weight percentage,
      C: 3–4.5%, Si: 1.5–4.5%, Mn: 0.1–2% and Mg: 0.02–0.2%, and
      0.1–5% of at least one stabilizing component selected from the group consisting of Mo, Cu, Cr, V, W, Sn, and Sb, and mixtures thereof, and
      Fe and incidental impurities as the balance, and
   wherein said internal ring portion comprises a cored spheroidal graphite structure dispersed in a mixed phase comprising a ferrite phase and a phase selected from the group consisting of a perlite phase, a beinite phase and a martensite phase, said cored spheroidal graphite structure comprising a spheroidal graphite core and graphite peripherally deposited around said core.

10. The combined roll as claimed in claim 9, wherein said internal ring portion is integrally metallurgically bonded to said external ring portion by means of casting said internal ring portion into said external ring portion.

11. The combined roll as claimed in claim 10, wherein said core is formed during said casting.

12. The combined roll as claimed in claim 9, wherein said graphite peripherally deposited around said core is deposited by thermally treating said combined roll.

13. The combined roll as claimed in claim 9, wherein said mixed phase comprises a ferrite phase and a perlite phase.

14. The combined roll as claimed in claim 9, wherein said cemented tungsten carbide comprises said Co, Ni, and Cr as binder-phase defining components and said tungsten carbide as a hard-phase defining component.

15. The combined roll of claim 1 wherein the Ni content ranges from 5–10 wt %.

* * * * *